No. 642,970. Patented Feb. 6, 1900.
R. N. FAIRBANKS & O. B. JOHNSON.
WEIGHING SCALE.
(Application filed Feb. 28, 1895.)
(No Model.) 2 Sheets—Sheet 1.
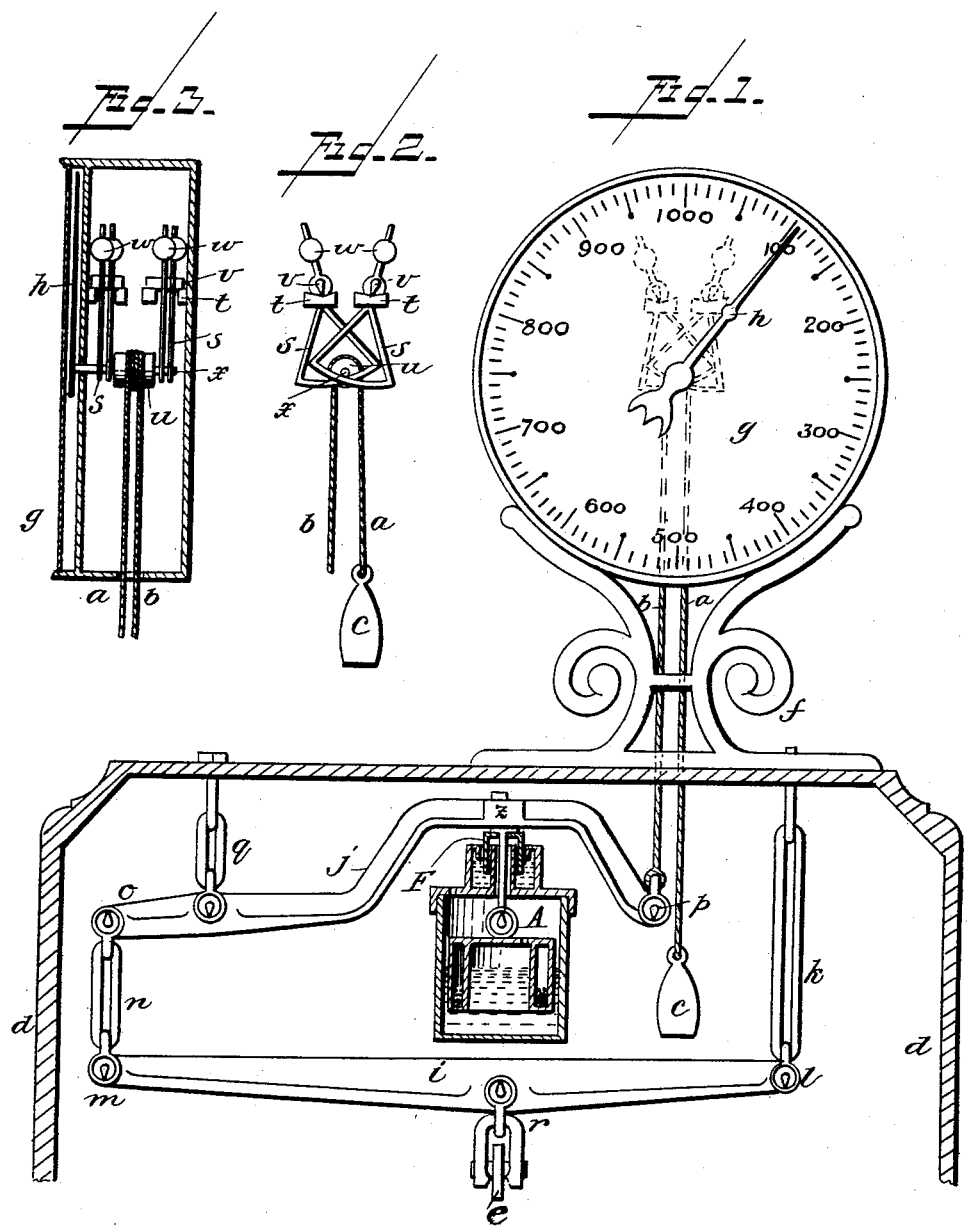
WITNESSES:
Franck L. Ourand.
Grace O. Burton.
INVENTORS:
Robert N. Fairbanks
Orville B. Johnson
BY
C. S. Sturtevant
ATTORNEY.

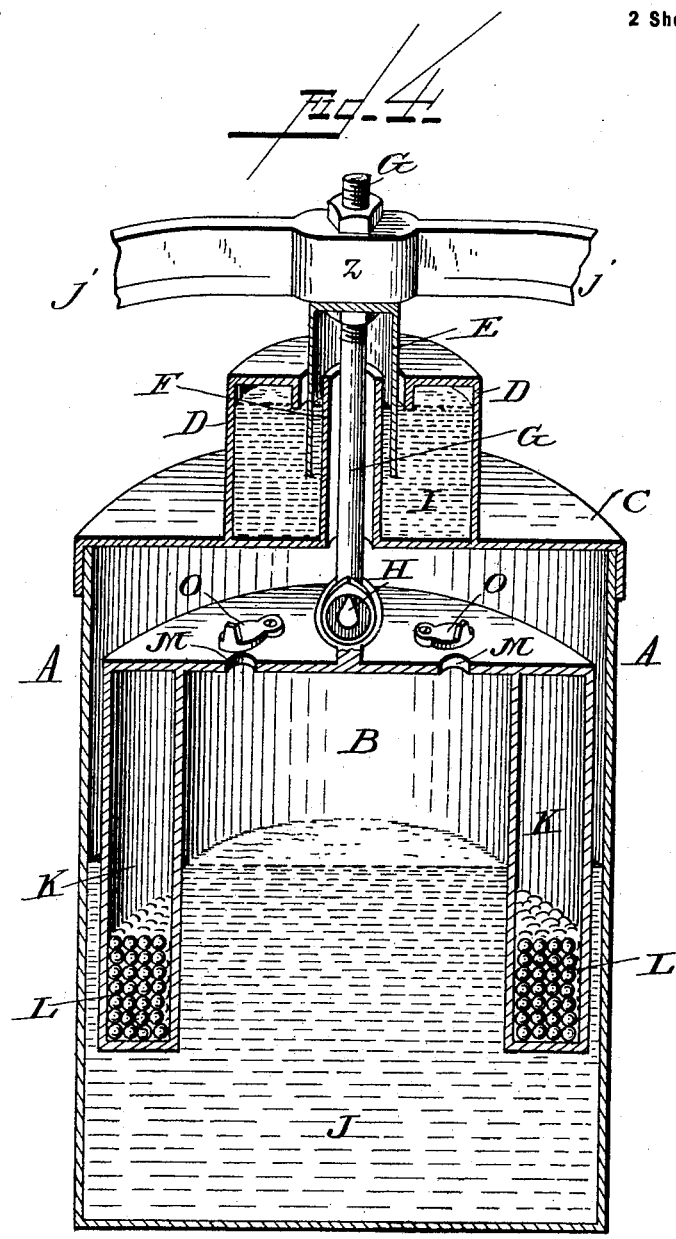

UNITED STATES PATENT OFFICE.

ROBERT NOYES FAIRBANKS, OF NEW YORK, N. Y., AND ORVILLE B. JOHNSON, OF ST. JOHNSBURY, VERMONT, ASSIGNORS TO THE E. & T. FAIRBANKS & COMPANY, OF ST. JOHNSBURY, VERMONT.

WEIGHING-SCALE.

SPECIFICATION forming part of Letters Patent No. 642,970, dated February 6, 1900.

Application filed February 28, 1895. Serial No. 540,372. (No model.)

*To all whom it may concern:*

Be it known that we, ROBERT NOYES FAIRBANKS, residing at New York, in the county of New York and State of New York, and ORVILLE B. JOHNSON, residing at St. Johnsbury, in the county of Caledonia and State of Vermont, citizens of the United States, have invented certain new and useful Improvements in Weighing-Scales, of which the following is a description, reference being had to the accompanying drawings and to the letters of reference marked thereon.

Our invention relates to an improvement in weighing-scales, and particularly to the class known as "platform-scales."

Platform-scales as ordinarily constructed are provided with graduated beams on which slide movable poises, and counterpoise-weights are used, as is well known.

It is the object of the present invention to provide a scale dispensing with the use of poises, graduated beams, and counterpoise-weights, and to provide an apparatus which shall be entirely automatic in its action and which shall indicate by means of a pointer on a dial the weight upon the platform.

We are aware that it is not broadly new to provide a scale which automatically indicates on a dial the weight of the body or person upon the platform—as, for instance, in the well-known nickel-in-the-slot scales; but the present invention is designed to simplify the construction of automatic scales, to render them less likely to get out of order, to increase their efficiency, and to provide means whereby the pointer on the dial comes almost immediately to rest, thus avoiding the undesirable oscillation of the same back and forth, as is usual in this class of scales.

Briefly, therefore, we provide a hollow plunger-weight suspended from an arm of the scale-beam in such relation to a liquid-containing vessel in which it works that the motion of the beam up or down will immerse the plunger-weight to a greater or less extent in the liquid, but never entirely submerging it, the downpull or effective weight of the plunger thus varying inversely as the amount of liquid displaced by it, the displacement by the plunger being proportional to the load upon the scale-platform and being indicated on the dial.

The invention therefore comprises, first, in a scale, the combination, with a platform or other support for the article to be weighed, of a scale-beam with intermediate levers between the beam and the platform, a vessel secured to the scale-frame, and a plunger-weight with interior air-space movable in said vessel and adapted to displace liquid contained therein, said plunger-weight being connected to the scale-beam and the latter connected to suitable indicating mechanism, whereby the movements of the beam up and down may be indicated.

Secondly, the invention consists in the combination, with a support for the article to be weighed and an indicating mechanism, of a beam located intermediate the two and a plunger-weight with interior air-space secured to said beam and arranged within a liquid-containing vessel, whereby equal movements of plunger displace equal amounts of liquid, said plunger and vessel serving the combined purpose of a dash-pot and suspended weight.

Thirdly, the invention consists in the particular construction of the plunger.

Fourthly, it comprises certain improvements in sealing the top of the vessel to prevent evaporations of liquid from the cylinder.

Finally, it consists in certain details of construction and arrangement of parts, as set forth in the appended claims.

The invention is illustrated in the accompanying drawings, in which—

Figure 1 is a front elevation, partly in section, of so much of our automatic scale as is necessary for an understanding of the invention. Fig. 2 is a detail elevation of the balanced hangers for supporting the shaft to which the pointer is attached. Fig. 3 is a side elevation of the same, and Fig. 4 is an enlarged detail of the plunger.

In the drawings, $d$ represents a portion of the supporting-framework of the scale to which is attached the standard $f$, supporting the box $g$, within which is journaled the drum $u$, carrying on its outer end the pointer $h$, adapted to register with the figures on the dial. This drum $u$ is supported at either end in the balanced hangers $s$ at the point of intersection of the same, these hangers having knife-edge pivots $v$, bearing on the blocks $t$, and having on their upper ends weights $w$, which keep them balanced. Passing over this drum $u$ is a cord or metallic ribbon, one end of which carries a counterweight $c$, and the other end $b$ is attached to the end of the scale-beam $j$. The scale-beam $j$ is connected in the customary way by a series of levers $e$ $i$, knife-edge pivots $l\ m\ o\ r$, and loops $k\ n\ q$, with a support for the articles to be weighed. At a suitable point $z$ on the beam $j$ an arm F extends into the vessel A, with the knife-edge pivot H, from which the plunger-weight B is suspended in such manner as to tend to balance any load to be weighed on the scale. The beam $j$ is also connected by the knife-edge pivot $p$ and a loop with the cord or metallic ribbon $b$. The counterweight $c$ tends normally to keep the pointer at zero.

Instead of providing the usual means for moving the indicator on the dial according to the weight on the platform transmitted through the multiplying-levers, we provide a closed vessel A, which is supported on the framework of the scale, (but this latter it is not deemed necessary to illustrate,) this vessel being preferably, though not necessarily, in the form of a cylinder and containing a certain amount of liquid. Traveling within this vessel and in its movement being immersed to a greater or less extent in the liquid is a plunger-weight B, and it is of course necessary, in order to have the divisions on the indicator-dial of equal lengths, that equal movements of the plunger-weight displace equal quantities of the liquid. This plunger-weight is marked B, and is preferably made in the form of a cylinder K, having double walls inclosing the cylindrical air-space. A cylinder is preferably made hollow and closed both at the top and at the bottom, except that the air-space is open at the bottom and at the top has the vent-openings M, the size of which may be regulated by the adjustable covers O. It is of course necessary in a device of this kind to have the plunger fit closely within the vessel, and to prevent undue oscillation we preferably weight the lower part of the hollow cylinder. The containing vessel is partially filled with liquid, as shown in the enlarged device, Fig. 4. This plunger is hung by means of a loop on a knife-edge pivot H, attached to the lower end of a rod F, screw-threaded on its upper end, as at G, and secured to the beam $j$ by nuts above and below the part $z$ of the beam $j$. This beam $j$ is bowed, as shown, to provide for the attachment of the plunger-weight. By making the plunger-weight fit the cylinder as nearly as is consistent with free movement the indicator is brought quickly and accurately to rest.

As the plunger-weight so nearly fills the cylinder, it is evident that a small change in the height of plunger-weight will increase or decrease its immersion to a much greater extent than the distance moved. The openings in the plunger-weight, moreover, are so adjusted that the escape or entrance of the air occupies a slight but appreciable time. It will thus be seen that when the plunger-weight moves up or down the effect is much the same as if the plunger-weight were solid until the air has had time to enter or escape, as the case may be. In the meantime the elasticity of the air in the interior as it is alternately rarefied or compressed by the motion of the plunger-weight tends more effectively to bring the beam to rest. To vary the specific gravity of the plunger, we have simply to put more or less weight into the interior ballast-space. When a load is put on the scale, the beam $j$, through the medium of the multiplying-levers, is raised, thus raising the plunger out of the liquid, and as this plunger, of course, exercises more of a downpull upon the beam the more it is raised out of the liquid it acts as a suspended weight to balance the weight of the article upon the platform, the indicator, of course, through the connections, following the movement of the beam and recording accurately the weight of the article. It will be seen, therefore, that the plunger acts as a suspended weight to keep the scale balanced, while the liquid-containing vessel aids in this result, as well as acting as a dash-pot for the plunger in the well-known manner.

To prevent evaporation of the liquid from the cylinder, we provide a sealing device. (Illustrated in detail in Fig. 4.) This plunger-cylinder is closed at the top, and mounted upon its cover C is a liquid-containing vessel D, which encircles the plunger-stem F, leaving a central tubular space in which the stem works. Supported on and encircling the stem and the central tubular space is a tube E, closed at the upper end and extending downward to a point between the surface of the liquid and the bottom of the vessel, so that during the up-and-down motion of the plunger the bottom end of this tube E is always below the surface of the liquid, so that while this opening provides sufficient space for the movements of the stem there will be little surface of the liquid in the vessel exposed to evaporation. The space between the moving and stationary parts is sufficient to admit of whatever lateral motion the stem may have without danger of contact between any of them, and the tube, which moves with the stem, is made very thin to reduce its buoyancy to a minimum.

Various modifications and changes in the details of our device may be provided without departing from the spirit of the invention, and we do not care to be limited to any particular shapes or construction of parts hereinbefore described and about to be claimed.

Having thus described our invention, what we claim, and desire to secure by Letters Patent, is—

1. In a scale, in combination with the beam, the suspending balancing-weight comprising the plunger secured to the beam, said plunger consisting of two concentric cylinders with a hollow space between, ballast in the lower part of said space for holding the plunger vertical, the inner cylinder being open at the bottom and provided with vent-openings at the top having lids, and a dash-pot within which said suspended weight or plunger is supported; substantially as described.

2. In combination with the liquid-containing vessel, the cover with the liquid-containing receptacle mounted thereon, and having a tubular opening through the same, a plunger having a stem passing through said tubular opening and provided with a downwardly-extending tubular portion of greater diameter than the tubular portion of the cover and extending below the surface of the liquid in the receptacle on the cover; substantially as described.

3. The liquid-containing vessel A, the plunger movable therein and having the upwardly-extending stem and provided with the tubular portion E, the cover C having the liquid-containing receptacle D, having a tubular opening through the center, and a cover for said liquid-containing receptacle provided with a central opening and a downwardly-extending rim, the lower end of this rim, as well as the lower end of the tube E, being below the surface of the liquid in the receptacle D; substantially as described.

4. In a scale a suspended plunger comprising a double-walled cylinder with a closed space between said walls and weighted at its lower end, said cylinder having an interior air-space with an open bottom connecting with the interior of the vessel in which it moves and having adjustable vent-openings at the top of said air-space; substantially as described.

In testimony whereof we affix our signatures in presence of witnesses.

ROBERT NOYES FAIRBANKS.
ORVILLE B. JOHNSON.

Witnesses to signature of Fairbanks:
E. HENRY BOARDMAN,
ALEX. G. VAN CLEVE.

Witnesses to signature of Johnson:
J. C. CLARK,
WM. C. TYLER.